US010425480B2

(12) United States Patent
Haapaoja et al.

(10) Patent No.: US 10,425,480 B2
(45) Date of Patent: Sep. 24, 2019

(54) SERVICE PLAN TIERING, PROTECTION, AND REHYDRATION STRATEGIES

(71) Applicant: Hitachi Vantara Corporation, Santa Clara, CA (US)

(72) Inventors: Steven Haapaoja, Boston, MA (US); Yury Kats, Belmont, MA (US); Cody Lee, Leominster, MA (US); Benjamin Isherwood, Tweksbury, MA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 669 days.

(21) Appl. No.: 14/316,319

(22) Filed: Jun. 26, 2014

(65) Prior Publication Data

US 2015/0381725 A1    Dec. 31, 2015

(51) Int. Cl.
*H04L 29/08* (2006.01)
*G06F 3/06* (2006.01)

(52) U.S. Cl.
CPC .......... *H04L 67/1097* (2013.01); *G06F 3/065* (2013.01); *G06F 3/067* (2013.01); *G06F 3/0611* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 7,197,520 B1* | 3/2007 | Matthews | G06F 11/1458 |
| 7,657,581 B2 | 2/2010 | Orenstein et al. | |
| 9,817,766 B1* | 11/2017 | Si | G06F 3/061 |
| 2004/0093361 A1* | 5/2004 | Therrien | G06F 11/1448 |
| 2005/0010620 A1* | 1/2005 | Silvers | G06F 3/0605 |
| 2007/0050415 A1* | 3/2007 | Armangau | G06F 3/0605 |
| 2007/0189153 A1 | 8/2007 | Mason | |
| 2008/0126404 A1* | 5/2008 | Slik | G06F 17/30174 |
| 2009/0271412 A1* | 10/2009 | Lacapra | G06F 17/30206 |
| 2010/0082765 A1* | 4/2010 | Murase | G06F 3/0608 709/213 |

(Continued)

FOREIGN PATENT DOCUMENTS

WO    2013147783    10/2013

OTHER PUBLICATIONS

Derek Gascon; Content Storage for a new Millennium; CAStor; 2007; pp. 1-9 (Year: 2007).*

(Continued)

*Primary Examiner* — Mariela Reyes
*Assistant Examiner* — Jermaine A Mincey
(74) *Attorney, Agent, or Firm* — Mattingly & Malur, PC

(57) ABSTRACT

A storage system stores objects and copies of objects on the storage system and other storage systems external to the storage system. The storage system stores the copies in storage pools of volumes, which are organized into one or more tiers. The configuration settings of each tier and each pool within the tier may be configured according to a user's preferences. In one example, the number of copies of data content and the number copies of metadata associated with the data content an individual pool stores may be specified. When objects are migrated between tiers, the objects are stored among the storage pools of the tiers. If the number of data content copies or metadata copies is increased, the data or metadata is copied from a determined copy source and if the number of copies decreases, the data is removed from the volumes in the pools.

19 Claims, 12 Drawing Sheets

(56) References Cited

U.S. PATENT DOCUMENTS

| | | |
|---|---|---|
| 2011/0106802 A1 | 5/2011 | Pinkney et al. |
| 2011/0138131 A1 | 6/2011 | Regni et al. |
| 2013/0159359 A1* | 6/2013 | Kumar .................. G06F 3/0605 707/822 |
| 2013/0339298 A1 | 12/2013 | Muller et al. |

* cited by examiner

SERVICE PLAN 1 — 700

TIER 1

| POOL NAME | DATA COPIES | METADATA COPIES |
|---|---|---|
| PRIMARY RUNNING | 2 | 2 |

TIER 2 — TIME SINCE INGEST: 30 DAYS — REHYDRATION TIME: 30 DAYS

| POOL NAME | DATA COPIES | METADATA COPIES |
|---|---|---|
| CLOUD 1 | 1 | 1 |
| CLOUD 2 | 1 | 1 |
| CLOUD 3 | 2 | 1 |
| NSF STORE 1 | 1 | 0 |

TIER 3 — SIZE ≥ 1M

| POOL NAME | DATA COPIES | METADATA COPIES |
|---|---|---|
| CLOUD 4 | 1 | 1 |
| NFS STORE 2 | 1 | 0 |

*FIG. 7*

ADD TIER

| | |
|---|---|
| TRANSITION<br>OPTIONS<br>STORAGE POOLS<br>  CONFIGURATION<br>REVIEW | TRANSITION<br>TIME SINCE INGEST TO MOVE OBJECTS TO THIS TIER<br><br>☐ DAYS |

FIG. 12A

ADD TIER

| | |
|---|---|
| TRANSITION<br>OPTIONS<br>STORAGE POOLS<br>  CONFIGURATION<br>REVIEW | REHYDRATION  ☐ ENABLE REHYDRATION ON READ, COPY<br>OBJECTS TO THE INGESTIER AND KEEP FOR<br>  ☐ DAYS |
| | METADATA-ONLY<br>MOVE ONLY METADATA FOR REPLICATED OBJECTS<br>TO THIS TIER AND DELETE THEIR DATA ON THIS SYSTEM.<br>OBJECTS THAT HAVE NOT BEE REPLICATED WILL NOT TRANSITION<br>TO THIS TIER.  ☐ ENABLE METADATA-ONLY |

FIG. 12B

ADD TIER

| | NAME | TYPE |
|---|---|---|
| TRANSITION<br>OPTIONS<br>STORAGE POOLS<br>  CONFIGURATION<br>REVIEW | ☐ PRIMARY RUNNING<br>☑ PRIMARY SPINDOWN<br>☐ SECONDARY<br>☐ MY S3 | RUNNING<br>SPINDOWN<br>SECONDARY<br>AMAZON S3 |

FIG. 12C

ADD TIER

| | PRIMARY SPINDOWN | |
|---|---|---|
| TRANSITION<br>OPTIONS<br>STORAGE POOLS<br>  CONFIGURATION<br>REVIEW | | DATA PROTECTION<br>REDUNDANCY FOR OBJECT DATA<br>STORED IN THIS POOL<br>[1 COPY V] |
| | | METADATA PROTECTION<br>REDUNDANCY FOR OBJECT-METADATA<br>STORED IN THIS POOL<br>[1 COPY V] |

FIG. 12D

SERVICE PLAN TIERING, PROTECTION, AND REHYDRATION STRATEGIES

BACKGROUND OF THE INVENTION

1. Technical Field

The present invention relates generally to storage systems and, more particularly, to a system and method for managing storage of content in a content system based on content selection for storage tiering.

2. Description of the Related Art

It is known in the art to store data on multiple tiers based on performance and speed of the devices within the tiers. For example, in a primary tier, data frequently accessed is stored on storage devices within that tier, whereas data determined to not be frequently accessed is stored on a secondary tier, which consists of storage devices that cost less than the primary storage devices to use, but are not as fast or do not perform well as the storage devices within the first tier. Further, U.S. Publication No. 2011/0138131 discloses that a first tier stores only metadata, and a second tier stores both data and metadata. U.S. Publication No. 2013/0339298 discloses that a client-side signature repository includes information representative of a set of data blocks stored in primary storage. During copy or backup operations, the system can use the client-side signature repository to identify data blocks located in primary storage that are new or that have changed. The system can also use the client-side signature repository to identify multiple locations within primary storage where different instances of the data blocks are located. Accordingly, during a copy or backup operation of one client computing device, the system can source a data block that is to be copied to secondary storage from another client computing device that includes a second instance of the data block.

BRIEF SUMMARY OF THE INVENTION

1. Problem to be Solved

Requirements for how content is stored on a device of a storage system have become increasingly dynamic. Content needs to be distributed across different storage systems over time with each device of the system having its own way of protecting the content and its own way of retrieving the content. This environment requires that content be able to dynamically be tiered to different pools and also that rehydration per tier be dynamic and the amount of copies per pool be dynamic. Without being able to configure pools with this type of detail the content could be either under protected or over protected, which is inefficient with respect to performance and cost saving considerations. In the under protected scenario content could be entirely lost. In the over protected scenario money is being wasted form content taking up more space than is necessary. Inability to configure rehydration periods has the same types of issues. If only one rehydration period can be set then some tiers may end up having rehydration set unnecessarily, which would waste storage space. Otherwise tiers would not rehydrate when needed resulting in poor read performance for the content.

Accordingly, it is an object of the present invention provide a storage system that is able to manage content to be stored on different tiers, which include storage pools consisting of different storage devices, according to customizable criterion.

2. Summary

A storage system is provided that allows for user-configurable data copies and metadata copies for each pool in each tier and user-configurable rehydration settings per tier containing one or more pools of storage volumes. User-configurable rehydration settings per tier allow the user to dynamically set whether the object is the brought back to the device into which it was initially ingested, and how long the object should remain on the initial ingest device, when a read is done against the defined tier. User-configurable data copies and metadata copies for each pool in each tier allow different protection levels for the content on each device in each tier. This flexibility would allow a user to have a tier with one pool having two data copies, another pool with one metadata copy, and a third pool with three metadata copies. The number of copies of data and metadata on each pool in a tier may be adjusted to store fewer or more copies accordingly. If there is a reduction in the number of copies for a pool, the excess copies are removed from the volumes associated with the pool. If the number of copies is increased for a given pool, copies are made onto volumes within the pool.

A Fixed Content System (FCS) contains data that does not change. Only a small percentage of the content is actually subsequently accessed; however the data still remains on storage media that is continually consuming power resources. Power is wasted keeping the media spinning even though much of the content on the media is not accessed. Further, the cost and performance of storing data differs depending upon the storage device the data is stored on.

Exemplary embodiments of the invention provide a fixed content system (FCS), which may be a replicated object storage system or content platform and which stores media in a Run Unit (RU) which do not allow spin-down functionality and a Spin-Down Unit (SDU) which do allow spin-down functionality as well as storage devices in other storage systems. For example, RU is designated for likely used content and SDU contains not-likely used content. As will become apparent in the following description, the RUs and SDUs are usually configured to be units within the primary storage of the primary storage system. While other storage systems connected with the primary storage system store data in cloud storage or on storage devices using the network file system protocol (NFS device or NFS based storage), for example. Storage tiering is performed by a service that periodically or on demand copies or removes objects on volumes within storage components that are within pools according to the settings of a service plan.

A method of managing storage of content of a system in storage units including RUs and SDUs establishes a storage tiering policy indicating what content is eligible to be stored on certain pools, which may have volumes on different storage systems. In one example, content may be copied from a RU on a storage device of the primary storage system to a SDU of a storage device of a primary storage system. The storage tiering policy (based on transition criteria) is applied to at least a group of the contents in the content system to determine stored content eligibility thereof for storage in the storage pools and migration between the storage pools; and identifying candidates of contents to migrate between the storage pools based on the storage tiering policy. The processes of implementing storage tiering rules to migrate contents between RUs and SDUs is explained in more detail in Application number PCT/US2012/031102, which is incorporated by reference herein.

Further, a primary storage system which handles the ingest of data is organized into namespaces (which is explained below) and each namespace has a configurable service plan. Service plan transition criteria is set in the service plan for each namespace and the storage tiering service (STS) runs periodically to manage data content and associated metadata of objects within the namespace according to the criteria set in the service plan. In some embodiments, the storage tiering rule is established to evaluate the contents to determine stored content eligibility based on a set of criteria which include, but are not limited to, expected usage, life-cycle, age of a content, rehydration time period, and existence of one or more redundant backup copies of the content.

BRIEF DESCRIPTION OF THE DRAWINGS

FIG. 7 illustrates the management information included in a service plan that may be set by a user according to an embodiment of the present invention.

FIG. 12 shows an example of a user interface for selecting a service plan out of a plurality of service plans each specifying a storage tiering strategy, including (a) a screen shot for setting a "time since ingest" transition time criteria, (b) a screenshot for setting the rehydration time for a tier and whether the tier should be metadata only, (c) a screenshot for selecting a pool in a tier, and (d) a screenshot for selecting the number of data copies and metadata copies that a particular pool should store.

DETAILED DESCRIPTION OF THE INVENTION

Figure 1:
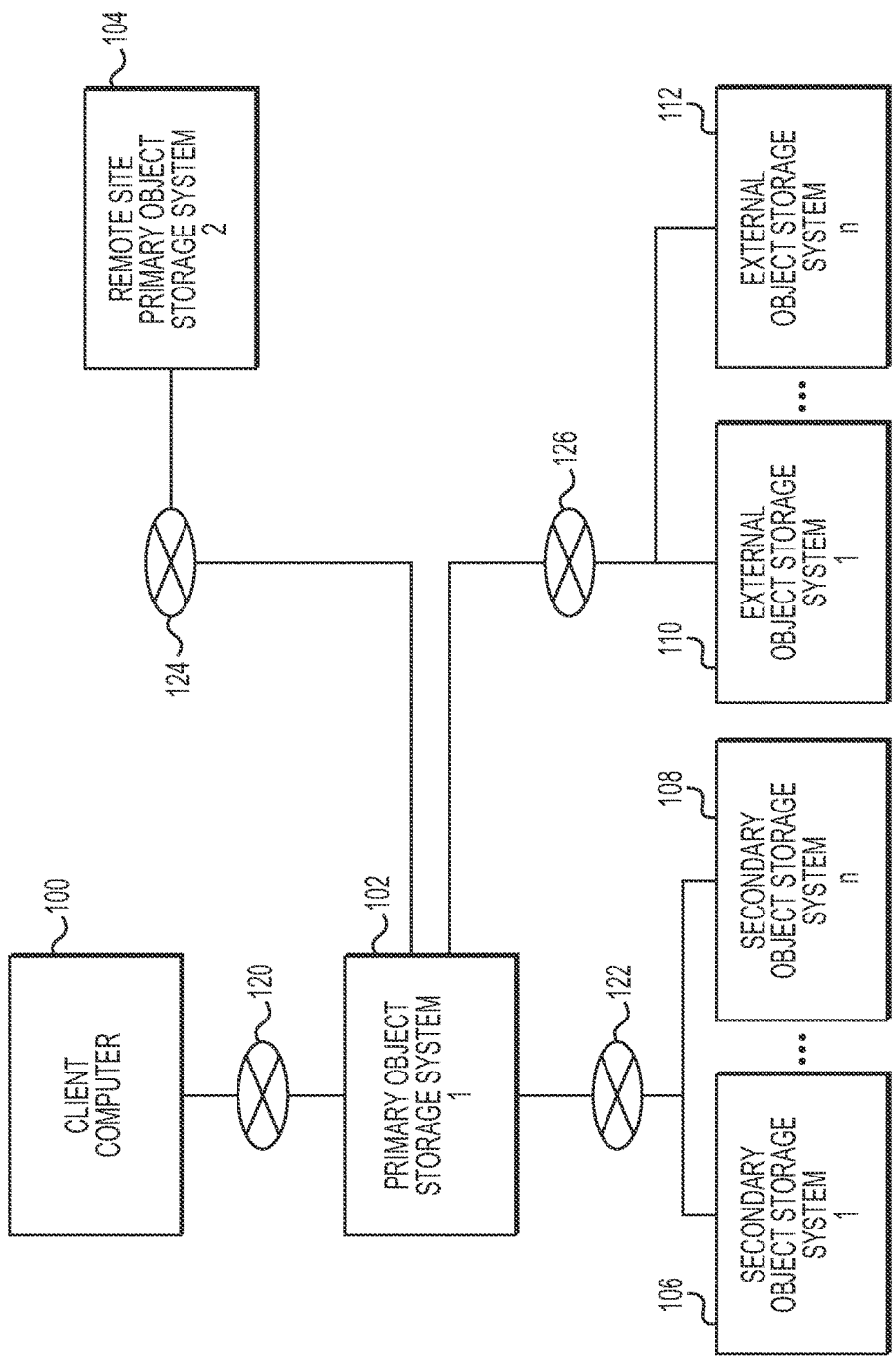
FIG. 1 illustrates an exemplary configuration of a client connected to a primary storage system and multiple storage systems connected to the primary storage system via networks according to an embodiment of the present invention.

In the following detailed description, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "an embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for a replicated object storage system to which embodiments of the present invention apply. In an archived storage system of object-based storage of fixed content data and associated metadata, the objects are replicated and stored across multiple storage systems, which may exist at different geographical locations. The storage systems are connected over networks.

FIG. 1 illustrates an exemplary configuration of a client connected to a primary storage system and multiple storage systems connected to the primary storage system via networks according to an embodiment of the present invention. FIG. 1 shows a client 100 connected to a primary storage system 102 via network 120. The client computer 100 may be one or more computers configured to perform I/O operations (at least write and read data) to the primary storage system 102 for object-based storage. The client computer 100 may send read requests to the primary storage system 102 to read data, which may be replicated on the primary storage system 102, one or more remote site primary object storage systems 104, multiple secondary object storage systems 106 to 108, and multiple external object storage systems 110 to 112. The networks 120, 124, 122, 126 may be a public Internet, an enterprise intranet, or other wide area or local area network or the like. When a client sends a write request to write data, the data is ingested into the primary object storage system and stored as a data object (or object, object data, etc.), which has data content (or file, rare data, data, etc.) and metadata (or metadata content) associated with the data content.

With respect to at least the primary object storage system 102 and remote site primary object storage system 104, the systems include a plurality of nodes (e.g., 300 of FIG. 4 or 410 of FIG. 3) and as a result, the storage system archives can automatically compensate for node failure or removal. The secondary 106 to 108 and external 110 to 112 storage systems are connected to the primary object storage system 102 via network 122 and contain volumes that store replicated objects of the primary storage system 102, including data content and metadata content associated with the data content. In some cases, the data content and associated metadata content may be replicated onto the volumes of the secondary 106 to 108 or external systems 110 to 112 without a copy existing on the primary storage system. As used herein the term volume is synonymous with a virtual disk having a set of disk blocks presented as a range of consecutively numbered logical blocks with disk-like storage and I/O semantics.

Accordingly, when a client computer 100 sends an instruction to write data to the primary object storage system 102, the primary storage system 102 ingests the data according to service plan and the data is replicated further according to the service plan and may store copies on the secondary 106 to 108 or external 110 to 112 systems according to the service plan. As shown, the remote site primary object storage system 104 may include one or more storage systems connected to the primary object storage system 102 via network 124. In the exemplary configuration of FIG. 1, the remote site primary object storage system 104 is not connected to the secondary 106 to 108 or external object storage systems 110 to 112, although this is not a requirement or a limitation.

In an embodiment of the present invention, the primary storage devices of a primary storage system 102 include volumes on RU media and SDU media. Embodiments of this invention will utilize these storage subsystems features to create pools of volumes within the RUs and SDUs. For example, an RU will be contained on RAID Groups that are not configured to allow disk spin-down functionality, so that there will always be power to the disks and available for data access. The SDU will be contained on RAID Groups that are configured to allow for disk spin-down, so that the disks can be powered down and hence the data on those disks will not be readily available until the disks are re-powered and have spun back up. In an embodiment of the present invention, the primary object storage system 102 has the hardware and software configurations explained in FIGS. 2-4. Configurations of the primary object storage system 102 of an embodiment of the present invention may be of a plurality of nodes grouped into clusters, or a plurality of nodes are connected to a storage area network (SAN), which includes a plurality of storage devices. Another configuration of the primary storage system may be that each node has internal storage devices and the nodes are connected to a SAN. The remote site primary object storage system 104 may have the same or different configuration as primary object storage system 102. Of course, these are exemplary configurations. The primary object storage system 102 may be connected to a disk array having storage devices or each node may have internal storage devices. These storage devices may be referred to herein as the primary storage. The RU media and SDU media are contained in the primary storage of the primary storage system 102.

As shown in FIG. 1, multiple secondary storage systems 106 to 108 are connected to the primary object storage system 102 via network 122. The secondary object storage systems 110 to 108 may be comprised of multiple volumes of storage devices using network file system (NFS) protocol. A volume contained on a storage device using NFS protocol is herein referred to as an NFS device. Network Attached Storage (NAS) systems may be storage devices in a secondary object storage system 106 according to embodiments of the present invention. Accordingly, there may be one or more volumes on the NAS (NFS device) containing data content and/or metadata copies. Further, as shown in FIG. 1, multiple external storage systems 110 to 112 are connected to the primary object storage system 102 via network 126. External storage systems 110 to 112 include cloud storage systems typically accessed through a web service application programming interface (API). Cloud object storage services and infrastructures sold under the trademarks Amazon (Simple Storage Service) S3, Microsoft Azure, Hitachi Cloud Services, and Google Cloud may be embodied as the external object storage systems 110 to 112.

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

Figure 2:
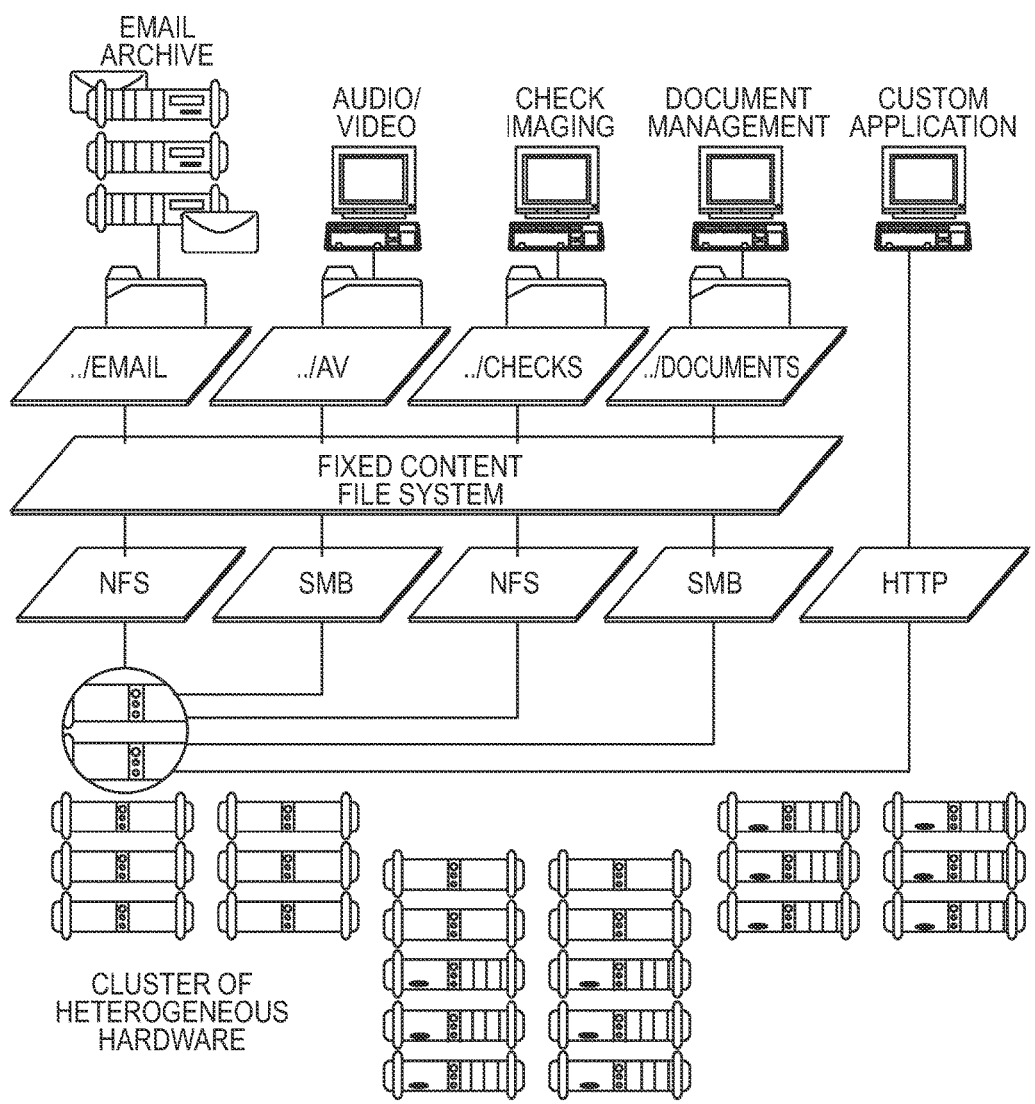
FIG. 2 is a simplified block diagram of a fixed content storage archive in which the method and apparatus of the invention may be applied.

FIG. 2 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes.

Figure 3:
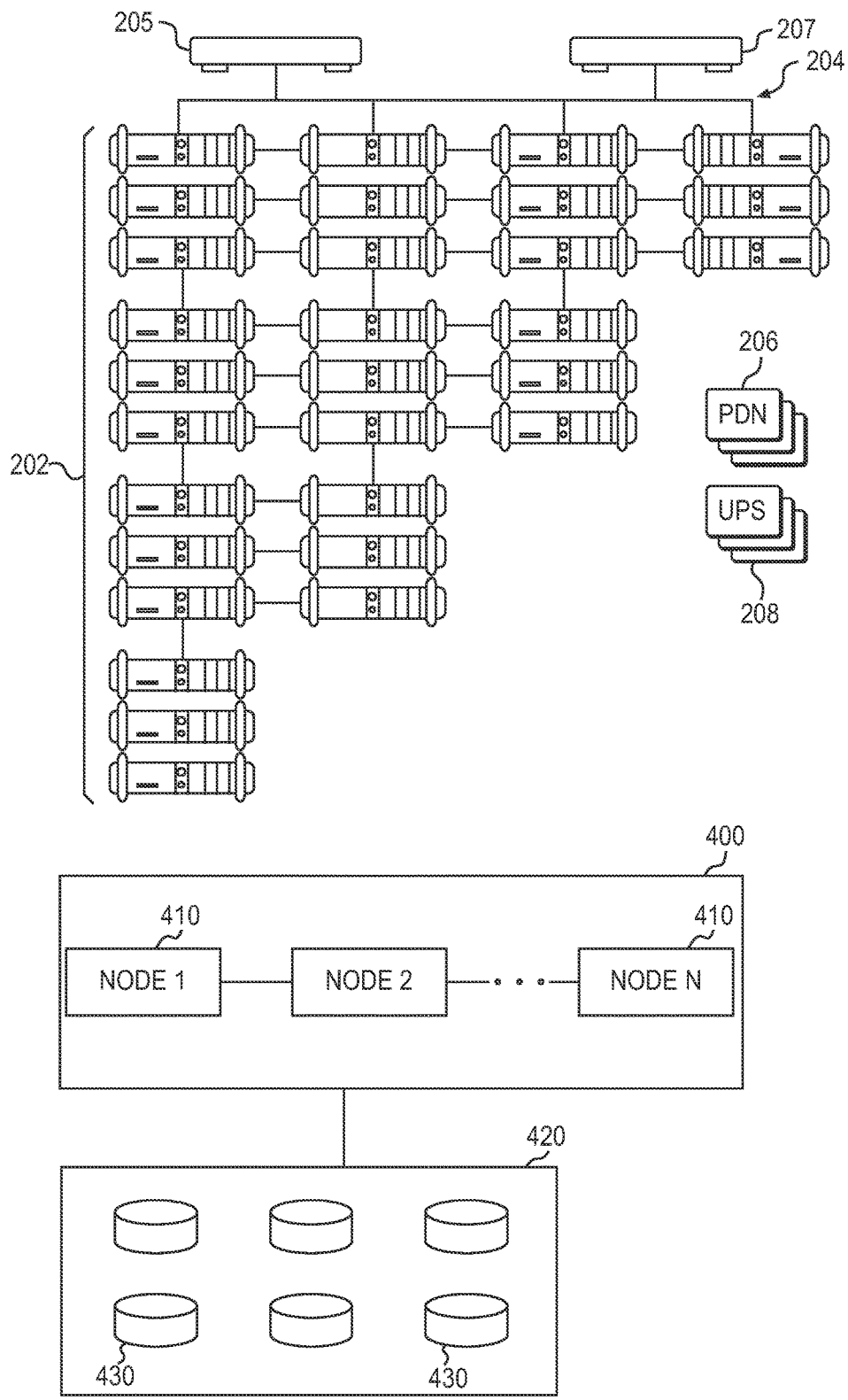
FIG. 3 is a simplified representation of a redundant array of independent nodes each of which is symmetric and supports an archive cluster application and a simplified diagram of a fixed content system having a group of nodes that are coupled to a block-based storage sub-system to store the fixed content.

Preferably, each node is symmetric with its peers. Thus, because preferably any given node can perform all functions, the failure of any one node has little impact on the archive's availability. As described in commonly owned U.S. Pat. No. 7,155,466, it is known in a RAIN-based archival system to incorporate a distributed software application executed on each node that captures, preserves, manages, and retrieves digital assets. FIG. 3. illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data.

FIG. 3 is simplified representation of a redundant array of independent nodes each of which is symmetric and supports an archive cluster application. As shown in FIG. 3, an illustrative cluster in which the present invention is implemented comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2 U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate DNS name server.

Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like. The file protocols are also used to communicate between storage systems (primary, secondary, and external storage systems).

According to exemplary embodiments, a fixed content system (FCS) 400 has a group of nodes 410 that are coupled, typically via a network, to a block-based storage sub-system 420 having a plurality of storage media units 430 to store the fixed content, as shown in FIG. 3. In an embodiment, the storage sub-system is a back-end disk array that allows a group of disks to be configured together into a RAID Group and carved up into individual logical disk units for satisfying storage needs. More advanced storage sub-systems have the ability to indicate which disk or group of disks is allowed to have the power controlled to RAID Groups to allow for powering the disks up and down. As will become apparent from the following descriptions, objects are replicated on volumes within the sub-system.

In one embodiment, the archive cluster application runs on a redundant array of independent nodes (H-RAIN) that are networked together (e.g., via Ethernet) as a cluster. The hardware of given nodes may be heterogeneous. For maximum reliability, however, each node runs an instance 300 of the distributed application (which may be the same instance, or substantially the same instance), which comprises several runtime components as now illustrated in FIG. 4. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 may also include a Web user interface (UI) 318 and an SNMP gateway 320. The Web user interface 318 is implemented as an administrator console that provides interactive access to an administration engine 322 in the file transaction and administration layer 306. The administrative console 318 may be a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308. Although not shown in FIG. 4, the policy manager includes a storage pool manager and a storage component manager, which are responsible for respective processes according to the present invention, which are apparent in the following description.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node.

The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 4:
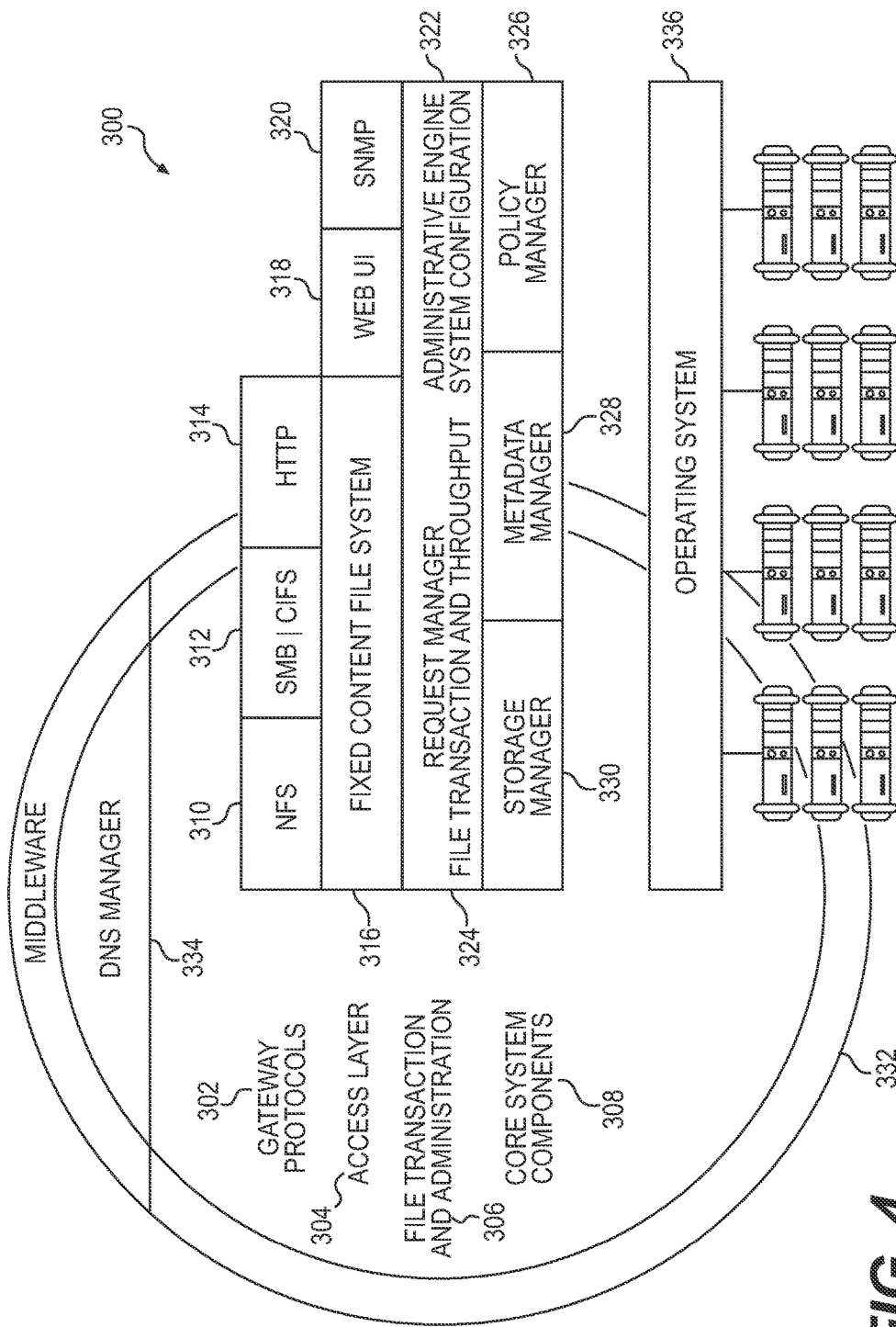
FIG. 4 is a high level representation of the various components of the archive cluster application executing on a given node.

As also illustrated in FIG. 4, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. In one embodiment, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records. The request manager 324 is responsible for executing the set of operations needed to perform archive actions by interacting with other components within the system. The request manager supports many simultaneous actions of different types, is able to roll-back any failed transactions, and supports transactions that can take a long time to execute.

The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

As used herein, a namespace is a logical partition of the cluster, and essentially serves as a collection of objects particular to at least one defined application. Each namespace has a private filesystem with respect to other namespaces. Moreover, access to one namespace does not grant a user access to another namespace. A cluster/system of nodes is a physical archive instance. A tenant is a grouping of namespace(s) and possibly other subtenants. A cluster/system is a physical archive instance. See commonly assigned U.S. Patent Application Publication No. 2011/0106802, which is incorporated herein by reference in its entirety. According to embodiments of the present invention, each namespace has a service plan, which is configurable as described below.

Figure 5:
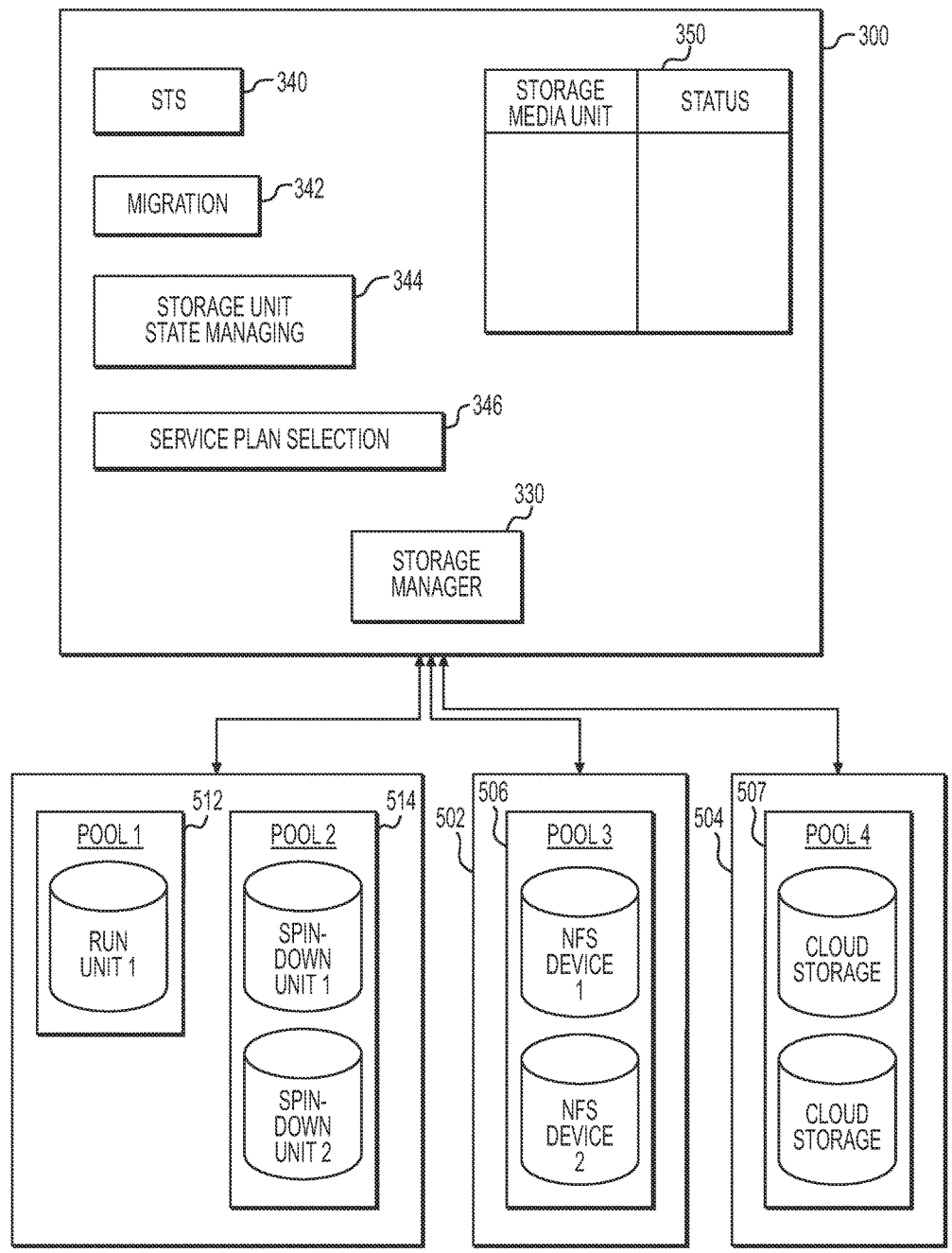
FIG. 5 is a simplified diagram schematically illustrating a node having a storage tiering service (STS) module, a storage media status table listing the storage media units in the node and their status, and multiple instances of the storage manager, the node is able to communicate with volumes on other storage systems that arranged into pools.

FIG. 5 is a simplified diagram schematically illustrating a node (300 of FIG. 4 or 410 of FIG. 3) of a primary storage system having a storage tiering service (STS) module 340, a storage media status table 350 listing the storage media units for the node and their status (e.g., capacity), and one or more instances of the storage manager 330 (see FIG. 4). For example, each instance of the storage manager 330 is responsible for a single root directory into which all files are placed according to its placement algorithm. As mentioned above, volumes exiting on other storage systems (e.g., secondary object storage systems or external storage systems) are arranged into pools according to the service plan of namespace of the primary storage system. FIG. 5 shows that a node of the primary object storage system can communicate (including I/O processing to read, write, and transfer data) with storage devices in the primary storage system 500, storage devices on a secondary storage system 502, and storage devices on an external storage system 504 through their respective networks and respective protocols. The storage devices 500, 502, and 504 contain volumes which the data and associated metadata of the primary storage system are replicated across. The volumes are arranged into pools 512, 514, 506, and 507, as shown.

As explained in more detail below, the pools 512, 514, 506, and 507 may be arranged into tiers, according to the service plan of the namespace. In this example, Pool 1 512 consists of a one or more volumes on RU media of the primary storage device 500 of the primary storage system. Pool 2 514 consists of one or more volumes on SPU media and another SPU media of the primary storage device 500 of the primary storage system. Pool 3 506 consists of one or more volumes on one NFS device and another NFS device on a storage device 502 within a secondary object storage system, for example. Pool 4 consists of one or more volumes on one or more storage devices 504 within an external cloud storage, for example.

According to embodiments of the present invention, a storage component manager manages and stores storage component items, which include storage component information, that is used to map volumes on a secondary or external storage systems to the primary storage system. At a high level, the storage component item, for the primary storage system, establishes which storage systems (cloud services, such as S3) it can connect to and what volumes on that system can be used. The storage component item is a collection of information that associates volumes on storage components (within storage devices) of secondary or external storage systems with the primary storage system so that primary storage system may access and use the volumes as necessary. An established storage component item is placed into a pool to complete mapping. The mapping is done using the storage component information within the storage component item. It is appreciated that storage components can include various storage media (e.g., disk arrays, hard disks, flash drives, RAM, etc.) and data may be stored in one or more volumes or virtual disks on the storage media. The primary storage system stores copies of data and associated metadata according to the information in the storage component item. A storage pool is a collection of storage component items that have the same type and each storage component item consists of selected volumes. For example, if three different NFS storage component items are established, and an S3 compatible storage component item is created, then the S3 storage component items cannot be placed in the same pool as an NFS storage component item because the storage component items are of different types.

With respect to the Amazon S3 service, which is used herein as an exemplary cloud storage system, objects are organized into buckets (which are volumes) and are identified within each bucket by a unique user-assigned key. Accordingly, for a user of such service, there are volumes (buckets) within the cloud storage space that the user owns. A bucket has a path such as "http://bucket.s3.amazonaws.com/key" or "http://s3.amazonaws.com/bucket/key."

Storage component information consists of, but is not limited to, a service connection string, a name, authentication information, https certificate, and volume (bucket) identifiers. For example, if in S3, a user has buckets b1, b2, and 3. The primary storage system of the present invention communicates with S3 using the storage component information which is configured accordingly. In a case using S3, the storage component information of the storage component item includes: a connection string (e.g., s3.aws.com); a name (e.g., "S3"); a type of storage component (e.g., S3), and the authentication information (typically username and password).

In this example, the type of storage component item refers to an S3 compatible type. In one embodiment, HS3 is a RESTful, HTTP(s)-based API which is compatible with clients written to use the Amazon S3 APIs. The HS3 API allows clients already written against the Amazon S3 API to be directed at an HCP system and continue to work without being changed. APIs for other services may be used and are compatible; S3 APIs are merely an example.

After establishing communication with S3, an http certificate is sent from S3, which is used for further communication. The http certificate is stored as storage component information within the storage component item. After establishing communication, a bucket listing is provided which lists the buckets (volumes) that the user owns within S3. In particular, policy manager makes an API call to Amazon, with the username and password in the storage component information, and Amazon responds with the buckets that the user owns in S3.

Then buckets from the list are selected to be associated with the storage component item and are included in the storage component information. Accordingly, less than all the buckets the user owns may be selected to be associated with the storage component item. In addition to selecting existing buckets, new buckets may be created. Some S3 compatible APIs may not support bucket listing. In this case, a bucket that exists can be communicated with and added to the storage component item. If for example, the user owns three buckets in S3 (e.g., b1, b2, and b3), the user may select b1 and b2 as the buckets (volumes) to be associated with the storage component item.

Once one or more volumes are selected to be included in a storage component item, the storage component item is established. However, mapping is not established until the storage component item is placed into a storage pool. In general, if the client wants to read off of a volume stored on a secondary or external storage system, the pool provides the mapping of the volumes within its pool.

A storage pool is created within a tier by adding a storage pool and first selecting a name (e. g., "pool 1). A type of the pool is established (e.g., S3) and only storage component items of the same type may be placed into the same pool. With respect to the guided user interfaces (GUIs) of the system, when a type of storage pool is selected, the user is presented with a list of storage component items of that type that can be included in the pool. Then the storage component item and bucket combinations for the pool can be selected. So, in the pool S3:b1 and S3:b2 may be selected, which represent bucket 1 in storage component item name S3 and bucket 2 in storage component item named S3, respectively.

With respect to a storage component using NFS, the connection string is an IP address or DNS name, and the name may be the name of the storage device (e.g., "HNAS" (Network Attached Storage)). In addition a list of available mounts is provided and one or more are selected to be associated with the storage component. When configuring the pool of volumes on an NFS device, the pool will have a type (e.g., NFS) and the mount points will be specified. As mentioned above, after the storage component item is placed into a pool, mapping is performed. However, for an NFS device storage component item, only one node on the primary object storage system performs the mapping because the NFS protocol does the mapping. However, for storage component items of cloud storage, every node in the system is mapped to every volume in the cloud.

Figure 8:
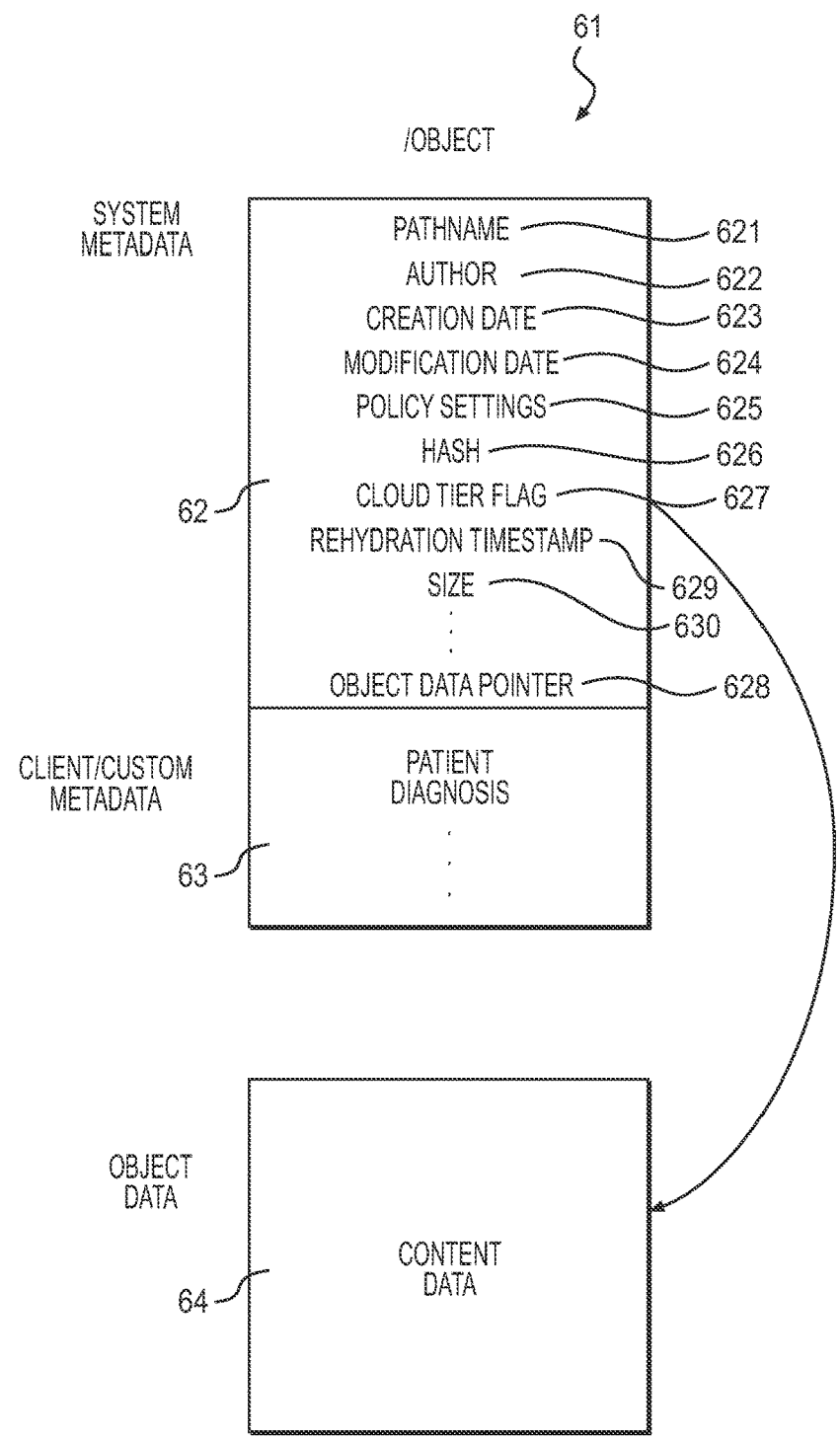
FIG. 8 is a simplified representation of the data structure of an object according to the present invention.

By way of the foregoing, pools containing one or more storage component items are established. As mentioned above, each storage component item contains one or more volumes that store copies of data content or metadata. Accordingly, each pool has a total number of volumes defined by the total number of volumes in each storage component in the pool. With reference to FIG. 8, a pool in a tier can be configured to store n number of copies (n is an integer) of data and n number of copies of metadata (this is explained in more detail below). However, the maximum number of data content copies that can be stored in a pool and a maximum number of metadata content copies that can be stored in a pool is defined by the total number of volumes in the pool. In other words, if a pool has two storage component items (component A and component B), and component A has two volumes and component B has 1 volume, the maximum number of copies of data content and metadata that can be stored in the pool is 3.

Further, in a pool, multiple copies (e.g., data content) are stored across components first, and then once each storage component in the pool stores a copy, the copies are stored across volumes in a component to provide redundancy and component resiliency. In other words, copies are distributed among the storage components first so that each storage component stores at least one copy if three are more copies to be stored than storage components in the pool. Then, multiple copies are distributed among volumes within a storage component already storing a copy. For example, if a pool has three components and the pool is configured to store three copies of data content, then one copy will be stored on each component. If a pool has three components and the pool is configured to store 4 copies of data content, the copies are distributed among the storage components first so each storage component stores a copy, then the fourth copy is stored on another volume within one of the storage components that already stores a copy. Accordingly, when data copies are stored on multiple volumes within a component, if a volume on that component fails, then the data copy is not lost on that component, it may be accessed on another volume. In addition, when data copies are stored across multiple components, if a component fails, then the copies may be accessed on the other storage components. Further, in some embodiments, storage components are grouped into pools to have different availability at different cost points.

Figure 6:
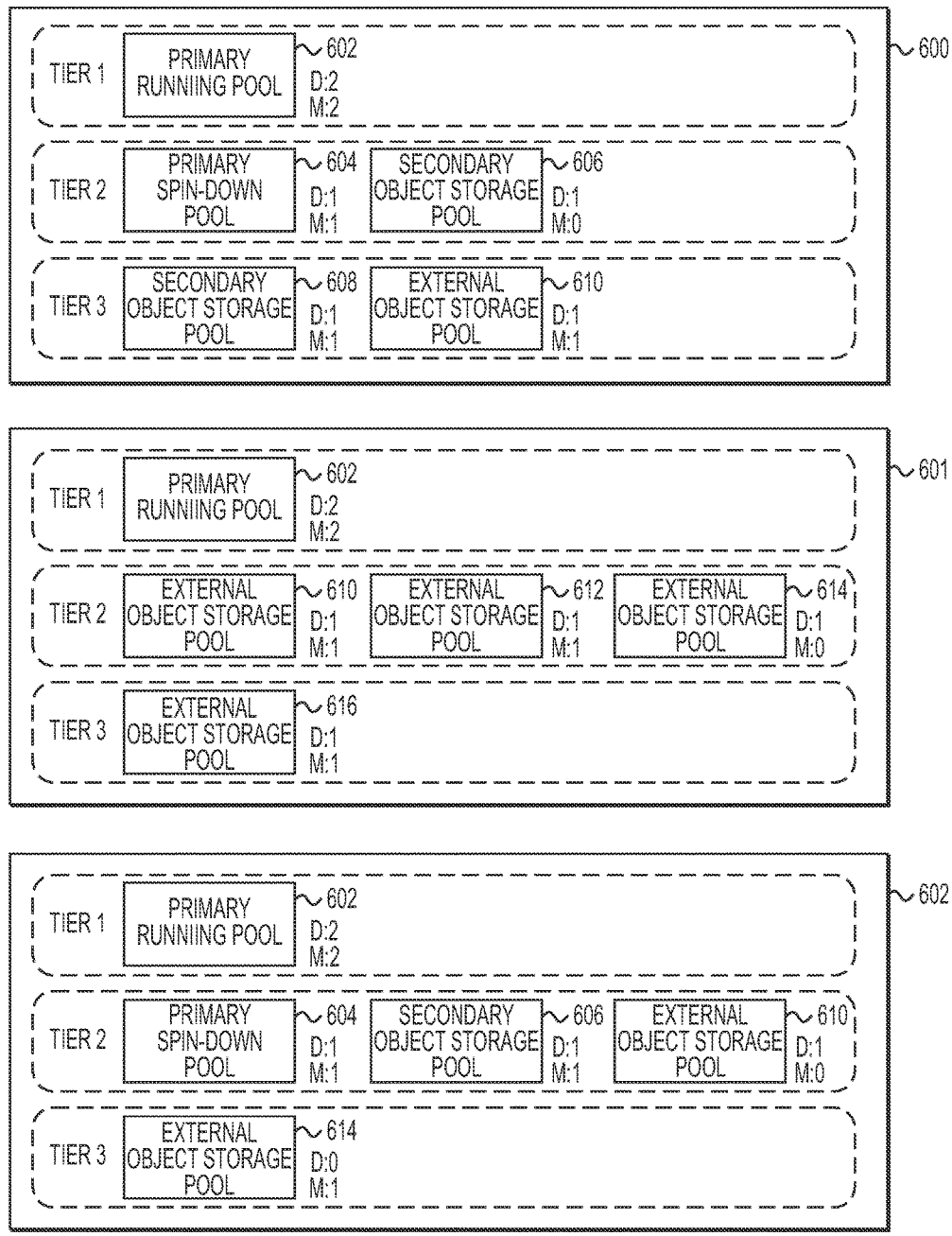
FIG. 6 illustrates an exemplary configuration of pools within tiers according to a service plan according to an embodiment of the present invention.

FIG. 6 illustrates an exemplary configuration of pools within tiers according to a service plan according to an embodiment of the present invention. As mentioned above, each namespace has a service plan that may be configured by a user. The service plan, among other configurations, configures the number of tiers, the transition criterion for each tier, the placement of pools within in a tier and the number of metadata and data copies stored on each pool of a tier. FIG. 6 shows 3 different service plan configurations as implemented by a primary storage system 102.

Each namespace has an ingest tier (e.g., Tier 1) with a pool consisting of volumes on the primary storage device of the primary storage system. In the first implementation 600, Tier 1 has a pool named Primary Running Pool 602, which is the pool that data are written to by a client 100 when ingested by the primary storage system 102. Primary Running Pool 602 includes volumes on the RU of the primary storage of the primary object storage system 102. As shown in FIG. 6, the number of data content copies of an object that is stored in Tier 1 is two and the number of metadata copies of an object that are stored in Tier 1 is two. Accordingly, two copies of data content and two copies of metadata are stored in the volumes of the Primary Running Pool 602.

Tier 2 is a tier configured by a user to include a pool named Primary Spin-down pool 604 and a pool named secondary object storage pool 606. In this example, Primary Spin-down Pool 604 consists of volumes on the SDU of the primary storage device of the primary object storage system 102 and stores one copy of data and one copy of metadata. Secondary Object Storage pool 606 may consists of volumes on one or more NFS device as configured by the storage component items of the pool and is configured to store one copy of data. Tier 3 is a tier configured by a user to include a pool named Secondary Object Storage Pool 608 and External Object Storage Pool 610. In this example, Secondary Object Storage pool 608 is configured to store one copy of data and one copy of metadata. External Object Storage Pool 610 may consist of one or more volumes in cloud storage and is configured to store one copy of data and one copy of metadata.

Service plan implementation 601 illustrates a change from service plan 600. As illustrated in FIG. 6, the change includes removing Primary Spin-Down Pool 604 and Secondary Object Storage Pool 606 in Tier 2. External Object Storage Pool 610 was added into Tier 2 from Tier 3. In addition, External Object Storage Pool 612 and 614 were added into Tier 2. Further, Tier 3 consists of newly added External Object Storage Pool 616.

Service plan implementation 602 illustrations a change from service plan 601. In implementation 602, Tier 2 is changed to include Primary Spin-Down Pool 604, Secondary Object Storage Pool 606 and External Object Storage Pool 610. Tier 3 includes External Object Storage Pool 614, moved from Tier 2 in implementation 601. However, External Object Storage Pool 614 is set to have 0 copies of data content and 1 copy of metadata. A user may set a pool to store zero copies of data content or metadata. However, as is described in more detail below, before the instruction is carried out by the STS to remove the data or metadata copies from a pool, the primary storage system 102 runs a check process to ensure that copies of the data are stored elsewhere in the replication topology (e.g., remote site storage system 104) so that removing data copies from the storage pool will not effectively eliminate all of the data stored (in the primary system or elsewhere) for an object. In some embodiments, the primary storage system 102 may have a policy to keep more than a predetermined number of copies (e.g., two) to ensure redundancy. If the number of copies for data content or metadata is set to be below the predetermined number, the removal is not processed. If a user configures or selects a pool or tier to be metadata only, then the same check process is carried out before the execution of the removal 'of the data from the system. Alternatively, the GUI may enforce the limit.

FIG. 7 illustrates the management information included in a service plan that may be set by a user according to an embodiment of the present invention. The management information is stored in the primary storage systems 102. In the exemplary service plan (Service Plan 1 700) illustrated in FIG. 7, there are 3 tiers (Tier 1, Tier 2, and Tier 3). Each tier has a tier name 702, pool name 708, the number of data copies stored in the pool 710, and the number of metadata copies stored in the pool 712.

In addition, each tier may have transition criterion settings 750, which are configurable by a user using GUIs as described below. The transition criterion 750 are criteria used to decide what objects are stored in each tier 702 based on information included in an object's metadata. The transition criterion 750 may be generated automatically by the system or provided by the user of the system.

The following are some examples of transition criterion 750: "Type of data." For example, x-ray images are rarely viewed after the injury has healed and therefore such type of data is a good candidate for storing on a spin-down unit, or on a secondary or external storage system. Whereas general medical records are frequently used and such type of data may be kept on an RU. The type of data is included in the metadata of an object. "Time from last access" may be used as criteria. It may be desirable to move data based on its access history. Content that has not been accessed in a while (e.g., six months or more) is a good candidate for spin-down, while content that is accessed more frequently may be moved to run devices. The third criterion is "Time since ingest." It may make sense to move some types of data to another tier immediately on ingest (e.g., when the data is for back-up only), or six months after ingest, etc. "Rehydration time" is also a transition criteria or may be enabled as an option for a tier. Rehydration time refers to how long data is rehydrated to a pool on Tier 1 (e.g., ingest tier) before being migrated back to the tier having the rehydration period defined. Rehydration of data and associated metadata occurs if a read operation is done for data stored within a pool within a tier having rehydration enabled, then the data and metadata is copied to a pool (typically having RU) on tier 1 (e.g., ingest tier) and a rehydration time stamp is set in the metadata of the object. Once the storage tiering service (STS) runs, it scans the metadata associated with the data content and determines whether the object should be removed from tier 1 by comparing the rehydration time stamp 629 with the present time. For example, if 30 days (the rehydration time period) has passed, then the object is removed from tier 1 (possibly after being copied back to the tier having rehydration enabled).

Although enabling rehydration is explained herein as a transition criteria 750, it may also be represented as an option for a tier. Whether rehydration is selected as an option or a transition criteria 750, it has the same affect for a tier and the contents stored in the tier.

The transition criterion 750 described above are merely examples and a transition criteria may be based on a metadata attribute that the metadata manager 328 (see FIG. 4) can query to determine candidates that fit the criteria. In other words, the metadata manager 328 can search the metadata and create classes of data based on an attribute of the metadata. As an example, size may be included as a metadata attribute, so the transition criteria may be set to be data greater than 1 megabyte, for example. In this case, the metadata manager 328 may search the metadata of objects in the namespace for size greater than one megabyte and return a class or list of data greater than 1 megabyte. Accordingly, the transition criterion 750 may be classes or sets of data that can be determined according to metadata attributes. Accordingly, any metadata attributes that can be queried by the metadata manager 328 can be established as transition criteria, including the custom metadata. The transition criteria 750 may also be user defined to be set as a doctor's name (e.g., Dr. Smith). In this case, the custom metadata is queried by the metadata manager to determine objects having Dr. Smith as the Doctor's name.

In FIG. 7, Tier 1 has a pool name 708 Primary Running and stores two data copies and two metadata copies. The number of data copies 710 and number of metadata copies 712 may be configured automatically or set by the user and do not have to be equal. However, the system limits the maximum number of copies of data 710 and metadata 712 that may be stored based on the total number of volumes within the pool (no matter which storage component they are on). In addition, and as mentioned above, while the data copies for a pool may be set to zero, the system ensures that the data (which will be removed from the pool if set to zero) is replicated elsewhere in the replication topology before the STS executes removal of the data on the pool.

Tier 2 has two transition criterion 750 set: "time since ingest: 30 days" and "rehydration time: 30 days." Accordingly, Tier 2 is configured to store metadata and data copies across its pools that were ingested 30 or more days ago and the those copies have a rehydration time of 30 days, which means if a read is done against data in Tier 2, then the data is copied to Tier 1 (more specifically, a volume on Primary Running pool) and is stored there for 30 days and at 30 days the STS removes the data from Tier 1. Tier 3 is set to have transition criteria of data having a size over 1 megabyte. As mentioned above, this class of data will be stored on Tier 3 across the Cloud 4 and NFS store 2 pools.

One purpose of the rehydration transition criteria is to copy certain objects (data on a Tier having a rehydration criteria set) to the primary storage (which has better performance characteristics than a secondary or external storage system) of the primary object storage system 102 so the data is made available to the client at a faster speed. The rehydrated data may be expected to be used more frequently within a given time period (e.g., 30 days) and less frequent after the time period. Therefore, the object is copied onto the primary storage device having better performance characteristics than a storage device of a secondary 106 or external object storage system 110, which may not have the same performance characteristics, but may be less expensive to use. Using the rehydration time stamp 629 in the metadata 62 (explained below) instead of resetting a creation time cycle of the data allows the creation time (creation date 623) of the data to continue (i.e., not reset). Instead the rehydration time is set to keep track of when the data should be migrated off the primary storage.

FIG. 8 is a simplified representation of the data structure of an object according to the present invention. FIG. 8 shows a simplified representation of the data structure of an exemplary object 61 according to the present invention. As mentioned above, each namespace is a logical partition which serves to store objects and each namespace has a private file system with respect to other namespaces. Within a given namespace, a stored object is made up of system metadata 62, custom metadata 63 and object data 64. The object data 64 is the content of the EF provided to the cluster to be stored. Alternatively, in the case where multiple IFs correspond to a given EF, the content is generally used to represent the IFs. The custom metadata 63 is information specified by a client or application which can provide additional information for managing and identifying the object data. For example, in a namespace which stores patient records of a hospital, the custom metadata may be set to include patient information, diagnosis information, treatment information, etc. The system metadata 62 is information which specifies information for identifying the object 61 within the given namespace.

By way of example, the system metadata 62 can include: pathname 621, author 622, creation timestamp 623, modification (or change time) timestamp 624, policy settings 625, a hash of the object data content 626, a pointer to the object data content in the cluster 628, cloud tier flag 627, rehydration time stamp 629, and size 630. However, the present invention is not intended to be limited to foregoing list and the scope of the present invention includes other types of metadata which one of ordinary skill in the art would recognize as useful in the management of object-based storage. Of particular relevance to the present invention are the cloud tier flag 627 and rehydration time stamp 629 metadata. In addition, creation date 623 may be used to identify the ingest time. Size 630 may indicate the size of the data content 64.

As mentioned above, when a read request is done for data stored in a tier that has a rehydration time as a transition criteria, then the data is copied to the primary storage and the metadata manager sets the rehydration time stamp 629 to the access time so the metadata manager may evaluate the rehydration time stamp 629 at a subsequent time to determine whether the rehydration time period set for the tier has elapsed. Accordingly, rehydration time stamp 629 may be a time indicating when that data content was accessed.

A cloud tier flag 627 is set if any copies of the data are stored in cloud storage. Cloud tier flag 627 may be set to be True, indicating the flag is set, or False indicating the flag is not set. For example, when the data progresses from the ingest tier to a tier having a pool that has volumes in cloud storage, then the cloud tier flag 627 is set. In other words, the cloud tier flag 627 indicates to the system that this data or copy of data is stored in cloud storage. The indication that a copy is stored in cloud storage is relevant to certain services performed by the primary object storage system.

In an embodiment of the present invention, the primary object storage system periodically runs a content verification service. Each object has a hash value that is calculated form the data content 64. The content verification service ensures the integrity of each object by periodically checking that its data still matches its hash value. If a copy is moved to cloud storage, the primary system 102 may not have control over the protection or verification of the object, so the cloud tier flag 627 is set and the content verification service skips this object as a result of the flag 627 being set. In an embodiment of the present invention, the primary object storage system also runs a scavenging service. The scavenging service protects namespaces from the loss of system metadata. If the service encounters an object with invalid metadata, it restores the correct metadata by using a copy from another location. However, if the data copy is in the cloud (the cloud tier flag 627 is set), the scavenging service skips that data. Of course, the services above are examples, and the cloud tier flag 627 may be relevant to other processes and services not listed. Other services that protect data and guarantee protection are skipped for data having the cloud tier flag 627 set in the associated metadata. A similar service process may be run on the data copy in the cloud storage by the operator of the external object storage system.

Figure 9:
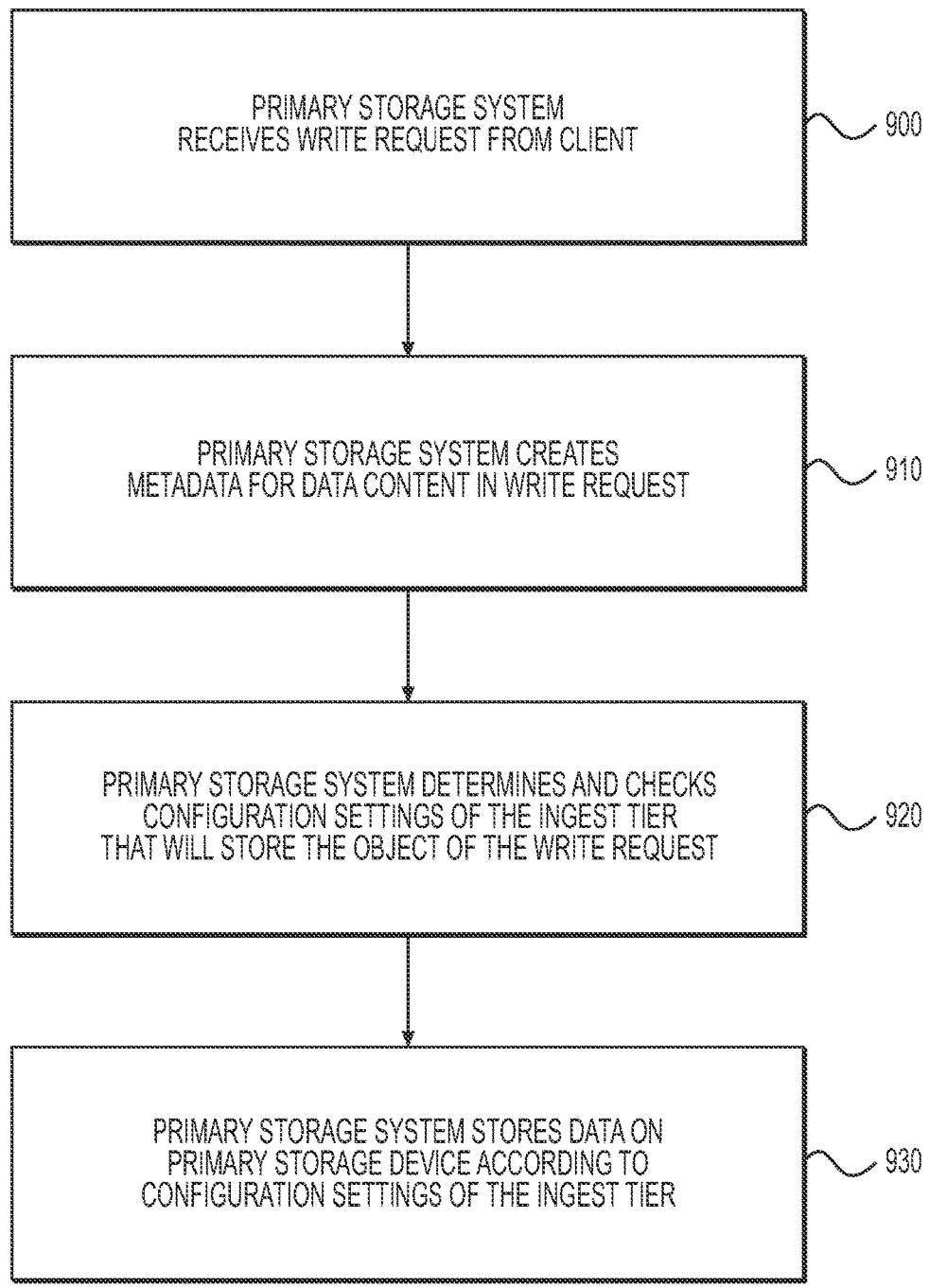
FIG. 9 is a flowchart illustrating the operations performed when a write request is received by a client to write data to the primary object storage system according to an embodiment of the present invention.

FIG. 9 is a flow chart illustrating the operations performed when a write request is received by a client to write data to the primary object storage system according to an embodiment of the present invention. As mentioned above, the ingest tier contains a pool of volumes (typically on the RU) of the primary storage device. At step 900, the primary storage system 102 receives a write request from the client 100 to store data on a particular namespace. At step 910, the primary storage system 102 creates metadata 62 for the data content 64 in the write request (see storage manager 330 and metadata manager 328 of FIG. 4). At step 920, the primary storage system 102 evaluates the configuration settings of the predefined or user defined ingest tier that will store the object of the write request. As mentioned above, each namespace has a service plan defining at least the tiers, configuration settings (including transition criterion) of the tiers, the pools, the number of metadata copies for a pool and the number of data copies for a pool. At step 930, the primary storage system 102 stores the data content 64 and metadata content 62 on (typically the RU) on primary storage device according to configuration settings of the predefined or user defined ingest tier. For example, if a pool on the ingest tier is set to store two copies of data content of an object and one copy of metadata of an object, then the system commits to disk (typically on the RU) of the primary storage device two copies of the data content and one copy of the metadata associated with the data content. In another example, the ingest tier may have transition criteria set. In this case, the system writes the data according to the transition criteria of the ingest tier.

Figure 10:
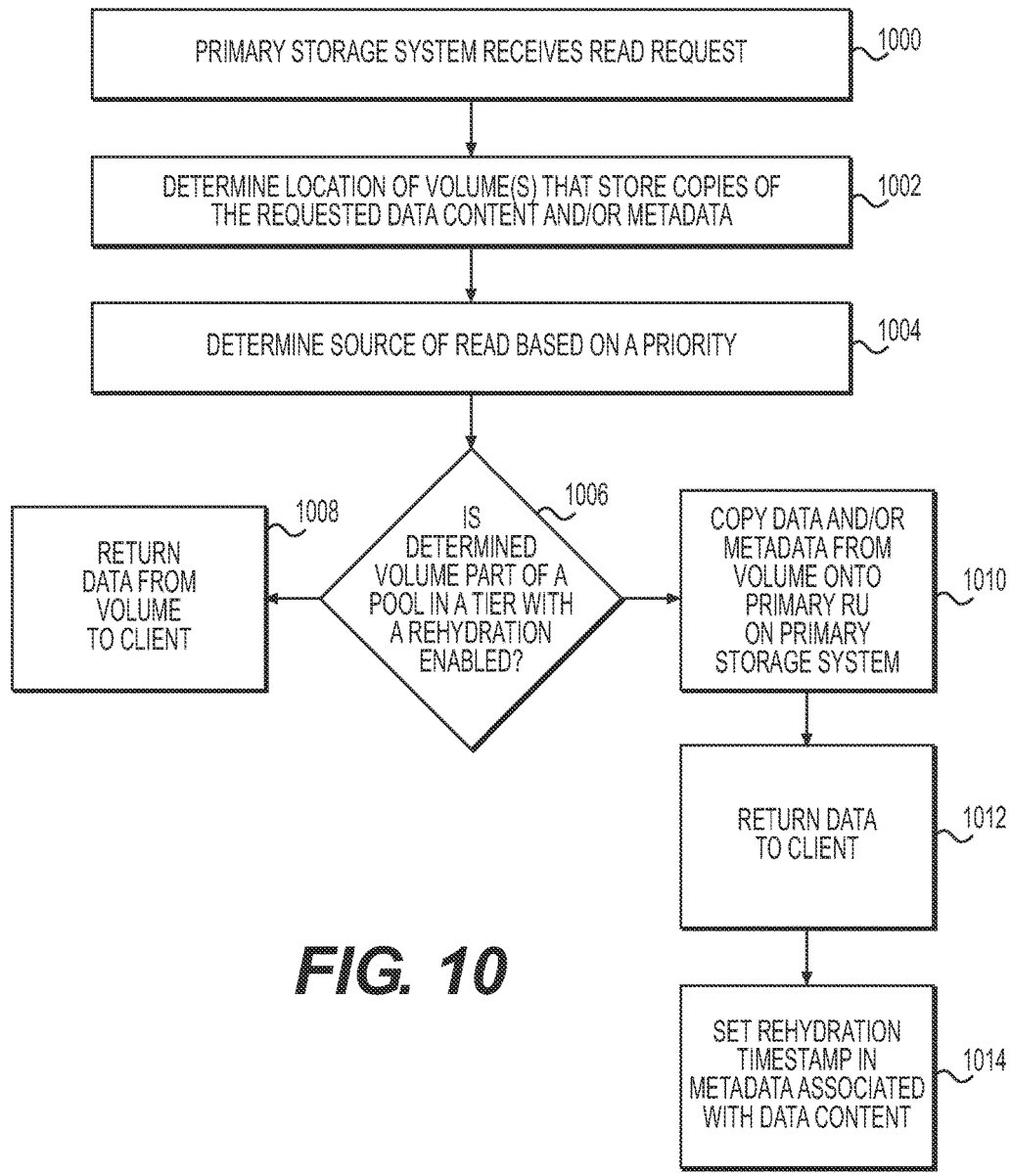
FIG. 10 is a flowchart illustrating process performed when the primary storage system receives a read request from a client according to an embodiment of the present invention.

FIG. 10 is a flowchart illustrating processes performed when the primary storage system receives a read request of data content and/or associated metadata from a client according to an embodiment of the present invention. At step 1000, the primary storage system 102 receives a read request of data content and/or associated metadata from a client 100. At step 1002, the system 102 determines the locations of the one or more volumes where the data copies of the data requested and/or metadata copies of the metadata requested are stored. The data and/or the metadata may be stored in multiple volumes in multiple pools. The metadata manager 328 identifies the location of the copies and after determining a source in step 1004, the request manager 324 retrieves the data and/or the metadata from the source, which is where a data copy and/or a metadata copy is stored. The source may be on the primary storage device (RU or SDU), secondary object storage system 106 or external object storage system 110 depending on service plan configuration. As mentioned above, the storage devices on the respective storage systems having different performance characteristics (e.g. typically the RU on the primary storage device performs better than a storage device in a cloud storage system). Accordingly, the system 102 selects a volume to read the requested data and/or metadata based on a predetermined prioritized order.

In step 1004, the process determines which volume will be the source of the read of the data. When choosing the source of the read of the data, the following is the order of preference that the system adheres to when deciding which volume of the volume locations identified in step 1002 to read from:

1. Data content is on RU of primary storage device
2. Data content is on SDU of primary storage device
3. Data content is on NFS device
4. Data content is on a storage device in cloud storage
5. Metadata only object on RU of primary storage device/SDU of primary storage device/NFS device/a storage device in cloud storage Accordingly the source of the read will be a volume on an RU, if the data content is on the RU (1). For example, if the location of a volume is not on an RU that stores data content (1), and the location of a volume is not on an SDU that stores data content (2), then the source of the read will be from a volume of an NFS device (3). In case (5) a read from replica is performed to stream the data from the appropriate source (the read request is performed over HTTP protocol). If the read request was performed over NFS or CIFS then a retry error is returned to the client without repairing the data from the replica. The client may keep attempting to perform the read until the data is repaired. The amount of time the client needs to wait for the repair is highly dependent on the network and data size.

In step 1004, the process determines which volume will be the source of the read of metadata. When choosing the source of the read of the metadata, the following is the order of preference that the system adheres to when deciding which volume of the volume locations identified in step 1002 to read from:

1. Metadata is on RU of primary storage device
2. Metadata is on SDU of primary storage device
3. Metadata is on NFS device
4. Metadata is on a storage device in cloud storage In each priority, if there is a volume storing both data content and associated metadata and a volume for storing only metadata, the volume storing both data content and associated metadata has high priority as source of the read of the metadata.

Once the source volume has been chosen, the system 102 evaluates whether the source volume is part of a pool within a tier that has a rehydration setting enabled as a transition criterion (or option) at step 1006. If the tier does have a rehydration setting, then the object (one copy of data content and one copy of associated metadata) is copied from the source volume into tier 1 (e.g., ingest tier and typically onto the RU of the primary storage device of the primary object storage system 102) or a user defined rehydration tier, in step 1010, and as described above. Then, at step 1012, the data is returned to the client to fulfill the read request. At step 1014, the metadata manager 328 sets the rehydration time stamp 629 in the system metadata 62 of the object being rehydrated as the access time. At step 1006, if the source volume is not in a tier that has a rehydration transition criteria set, then the data is read and returned to the client without being copied to tier 1 (typically the RU on the primary storage device) or the user defined rehydration tier, in step 1008.

Figure 11:
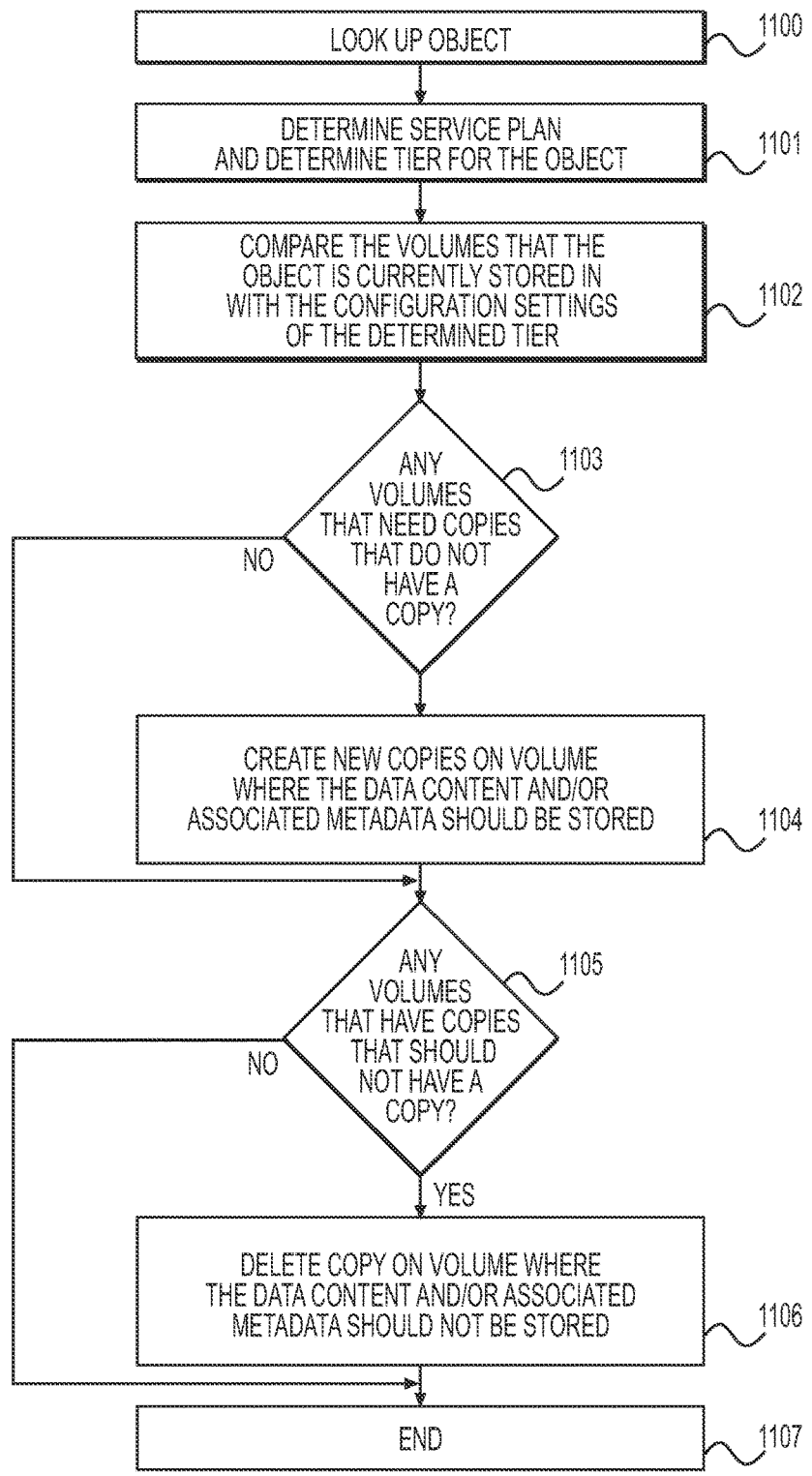
FIG. 11 is a flowchart illustrating the processes performed by the storage tiering service (STS) according to an embodiment of the present invention.

FIG. 11 is a flowchart illustrating the processes performed by the storage tiering service (STS) according to an embodiment of the present invention. The STS module 340 (see FIG. 5) performs the following processes. The STS runs periodically (e.g. hourly, daily) or by request by a user and performs certain functions (e.g. data or metadata migration, removal, or copying) according to the service plan of a namespace, which includes, but is not limited to: transition criterion of one or more tiers, the number of data copies and metadata copies stored in each pool set for each tier. The STS also migrates, copies, and removes data depending on tier addition or deletion, and pool addition or deletion. The STS identifies changes to a service plan from the last time the service performed successfully.

Examples of transition criterion are explained above with reference to FIG. 7. For purposes of explaining the processes of the STS we will use the "time since ingest" and rehydration time" as exemplary transition criterion. In general, when the STS runs it scans objects within the storage system to determine whether there are any candidates for a given transition criteria.

At step 1100, the STS module 340 looks up one or more objects. At step 1101, the STS module 340 determines (identifies) a service plan and determines a tier in the service plan that the one or more objects should be stored in. The service plan is determined based on the namespace where the object is stored. The STS module 340 determines a tier in the service plan for the object by referring to transition criteria of tiers of the service plan. In other words, the STS module 340 determines whether each object needs to be moved from the tier the object is currently stored on to another tier based on comparing the transition criteria of the current tier the object is stored on and another tier (which may be the determined tier). Namely, the determined tier in the service plan for an object means a tier having transition criterion satisfied by the object. In other words, the object should be stored in the determined tier based on the transition criterion of the determined tier. If more than one transition criteria are set to the tier, the STS module 340 checks each transition criteria.

Further, if the determined tier only includes one or more pools that are configured to store associated metadata and does not include a pool that stores data content (e.g., as in tier 3 of service plan 602 shown in FIG. 6), the replication manger checks other systems (e.g., remote site storage system 104) in the topology to ensure the data is replicated somewhere else in the topology. If the data is not replicated somewhere else, or if there are no other copies stored anywhere else, then the STS module 340 does not move the object to the determined tier.

At step 1102, the STS module 340 compares one or more volumes of one or more pools in which the data content and associated metadata of the object is currently stored with the tier configuration settings of the determined tier.

At step, 1103, the STS module 340 determines if there are one or more volumes of each pool where data content and/or associated metadata should be newly stored in the determined tier. If yes, then STS module 340 executes step 1104. If no, then processing continues to step 1105.

At step 1104, The STS module 340 creates new copies of data content and/or associated metadata on one or more volumes in each pool where the data content and/or associated metadata should be stored (but do not currently store copies of the data content and/or associated metadata) based on the configuration settings of the determined tier (indicating the number of copies of data content and associated metadata stored for each pool in the determined tier).

At step 1105, the STS module 340 determines whether there are any volumes in any pool that store data content and/or associated metadata that should not store the data content and/or associated metadata based on the configuration settings of the tier. If yes, the STS module 340 executes step 1106.

At step 1106, The STS module 340 deletes any copies of data content and/or associated metadata on one or more volumes in each pool where the data content and/or associated metadata should not be stored.

For example, as for the service plan 600 in FIG. 6, if an object is currently stored in tier 2 having the configuration shown, and the STS module determined a new tier (tier 3) that should store the object based on the transition criteria, the STS module compares tier configuration settings of tier 2 and tier configuration settings of tier 3 in the service plan 600 (step 1102). The STS module copies one copy of data content and one copy of associated metadata to one or more volumes in the secondary object storage pool, and copies one copy of data content and one copy of associated metadata content to one or more volumes in the external storage pool (step 1104). The STS module 340 subsequently deletes one data content and one associated metadata copy of the object stored in one or more volumes of the primary spin-down pool.

More specifically for the process described in step 1104, when creating copies of the data content 64 of the objects, the copy source of the data is chosen from the following prioritized order:
1. Data content is on RU of primary storage device
2. Data content is on SDU of primary storage device
3. Data content is on NFS device
4. Data content is on a storage device in cloud storage
5. Metadata only object on RU of primary storage device/SDU of primary storage device/NFS device/a storage device in cloud storage The source is chosen according to prioritized order as identified and explained above. Accordingly, if the data content 64 is on the RU of the primary storage device, then that pool (volume in that pool) is the copy source for migrating data to the tier having the transition criteria. After the source is chosen the data is copied to pools in the tier and stored according to the number of copies of data set for each pool. The copies of the data on the source tier are subsequently removed.

More specifically for the process described in step 1104, when copying the metadata 62 associated with the data content 64, the copy source of the metadata 62 is chosen in accordance with the following prioritized order:
1. Metadata is on RU of primary storage device
2. Metadata is on SDU of primary storage device
3. Metadata is on NFS device
4. Metadata is on a storage device in cloud storage In each priority, if there is a volume storing both data content and associated metadata and a volume storing only metadata, the volume for storing both data content and associated metadata has high priority for source of the read of the metadata. The copies of the metadata on the source tier are subsequently removed.

In a case that an object (one copy of a data content and one copy of associated metadata) is rehydrated to a tier (e.g., tier 1, typically an ingest tier, or user defined rehydration tier), the STS will transition the object off of tier 1 when the rehydration time period set in the transition criteria of the tier the object was rehydrated from elapses. The STS will identify the rehydration time period (e.g., 30 days) and subsequently identify candidate objects fitting the criteria stored on tier 1. For example, the STS identifies objects that have a rehydration time stamp 629 in metadata 62 that is 30 days or older. The candidates identified are subsequently removed from the pool in tier 1. In some embodiments the object is copied back to the tier it was rehydrated from before the data is removed on tier 1.

The following are exemplary scenarios provided to further explain the STS as it relates to the rehydration of objects. In one scenario a read is processed for file foo.text. The file is on a storage component in a pool for a tier where rehydration is not set, so the object is not rehydrated. In another scenario, a read is processed for file foo.txt. The file is on a storage component in a pool for a tier where rehydration is set to 30 days. In this scenario, the object is rehydrated and its rehydration time stamp 629 is set to the access time. Thirty days later, when the STS runs, the STS will remove the object on the storage component was rehydrated to. In yet another scenario, a read is proceed for file.txt. The file is on a storage component in a pool for a tier where rehydration is set to 30 days. The object is rehydrated and its rehydration time stamp 629 is set to the access time. After 28 days a user updates the rehydration setting to be 25 days. Subsequently, the STS will remove the object on the storage component it was rehydrated to the next time the STS runs. In yet another scenario, a read is processed for file foo.txt. The file is on a storage component in a pool for a tier where rehydration is set to 30 days. The object is rehydrated and its rehydration time stamp 629 is set to the access time. After 5 days, a user disables rehydration entirely for the tier (removes the rehydration transition criteria). In this scenario, the STS will remove the object on the storage component it was rehydrated to the next time the STS runs.

In addition, when the number of copies of data content or associated metadata in a pool for a certain tier is increased or decreased, the STS follows the process illustrated in Steps 1104 and Steps 1106, respectively, of FIG. 11. For example, if a user changed the number of copies of data content in a pool from 0 to 1 or from 1 to 0 in certain tier, then the STS would follow the processes illustrated in steps 1104 and 1106, respectively, of FIG. 11. Alternatively, if the number of copies of metadata or data is increased, the copy source may be a source within the same pool, if the pool stores one or more copies. However, in the situation where the number of copies (for data content or associated metadata of a pool) is increased or a pool is added, no copies are removed from the copy source.

In addition, during the STS, when an object is copied to a volume in a cloud storage system, the metadata manager sets a cloud tier flag 627 to indicate that copy is in cloud storage, which has consequences according to certain services or process run by the primary object storage system, as explained above.

To set the service plan, according to specific embodiments, a service plan selection module 346 (see FIG. 5) is configured to provide a graphical user interface for selecting a service plan out of a plurality of service plans specifying a storage tiering strategy that allows the user to set transition criteria and the number of data content and associated metadata copies for each pool.

FIG. 12 shows an example of a user interface for selecting a service plan out of a plurality of service plans each specifying a storage tiering strategy, including (a) a screen shot for setting a "time since ingest" transition time criteria, (b) a screenshot for setting the rehydration time for a tier and whether the tier should be metadata only, (c) a screenshot for selecting a pool in a tier, and (d) a screenshot for selecting the number of data copies and metadata copies that a particular pool should store.

In FIG. 12(A) a screen shot shows the ability of a user to set the "time since ingestion" transition criteria to be a number of days. FIG. 12(B) shows that a user may enable rehydration for a tier and set the rehydration time period to a number of days. FIG. 12(C) shows that a user can select a storage pool to configure. FIG. 12(D) shows that user can use the GUI to select the number of data and metadata copies a pool can store using a drop down menu, for example. In FIG. 12(D) it is noted that the GUI limits the maximum number of copies a user may choose for data protection and metadata protection. As mentioned above, the maximum number of copies is set to be the total number of volumes in a pool.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

What is claimed is:

1. A storage system comprising:
a plurality of storage components that each include a plurality of storage mediums configuring one or more volumes, which store a plurality of data content and metadata associated with the data content;
a memory coupled to a processor, the memory storing instructions that when executed by the processor, configure the processor to:
configure a plurality of storage tiers, each storage tier including one or more storage pools and at least one storage tier including at least two types of storage pools, and each storage pool including one or more of the plurality of storage components,
performing storage tier operations based upon a user-definable service plan, wherein the user-definable storage plan enables to store tier management information for each storage tier that respectively includes information about the type of each storage pool in each storage tier, which indicates performance characteristics of each storage pool, configuration information of each storage pool in each storage tier and one or more predetermined conditions for each storage tier including transition criterion used to decide what objects are stored in each storage tier based on information included in an object's metadata, wherein for each storage pool, the tier management information specifies, for each object, a number of copies of data content to be stored in each storage pool and a number of copies of metadata associated with the data content to be stored in each storage pool,
distribute a first number of first data content and a second number of first metadata associated with the first data content initially ingested into the storage system to a first storage tier, to store the first number of the first data content and the second number of the first metadata to at least one first storage pool of a first type in the first tier that has a first performance characteristic, according to the tier management information of the first storage tier, and
upon determining that the first data content or the first metadata stored in the first storage tier meets a first predetermined condition of the tier management information of a second tier, migrate the first data content and the first metadata according to the management information of the second storage tier to store a third number of the first data content and a fourth number of the first metadata to at least one second storage pool of a second type in the second storage tier that has a second performance characteristic, according to the tier management information of the second storage tier, wherein the third number of the first data content is lower than the first number of the first data content and the fourth number of the first metadata is lower than the second number of the first metadata.

2. The storage system of claim 1, wherein
the processor is further configured:
for each of the plurality of storage pools, limit the number of copies of the data content and the number of copies of the metadata associated with the data content that is stored in the tier management information to be less than or equal to the total number of volumes within each respective storage pool.

3. The storage system of claim 1,
wherein the processor is further configured to:
upon storing the first data content or the first metadata into the at least one second storage pool of the second storage tier, remove the first data content and associated first metadata from the first storage pool.

4. The storage system of claim 3, further comprising:
a computer having a display coupled to the storage system,
wherein the processor is configured to:
display a user interface on the display to accept an input to set the number of copies of data content to be stored and the number of copies of metadata associated with the data content to be stored for each storage pool, and
display a user interface on the display to accept an input to set the condition relating to metadata of the first storage tier in the tier management information.

5. A storage method for a storage system coupled to a plurality of storage components, the plurality of storage components each include a plurality of storage mediums that configure one or more volumes, which store a plurality of data content and metadata associated with the data content, the method comprising:
configuring, by a central processing unit, a plurality of storage tiers, each storage tier including one or more storage pools and at least one storage tier including at least two types of storage pools, and each storage pool including one or more of the plurality of storage components,
performing storage tier operations based upon a user-definable service plan, wherein the user-definable storage plan enables storing tier management information for each storage tier that respectively includes information about the type of each storage pool in each storage tier, which indicates performance characteristics of each storage pool, configuration information of each storage pool in the each storage tier and one or more predetermined conditions for each storage tier including transition criterion used to decide what objects are stored in each storage tier based on information included in an object's metadata, wherein for each storage pool, the tier management information specifies, for each object, a number of copies of data content to be stored in each storage pool and a number of copies of metadata associated with the data content to be stored in each storage pool;
distributing a first number of first data content and a second number of first metadata associated with the first data content initially ingested into the storage system to a first tier to store the first number of the first data content and the second number of the first metadata to at least one first storage pool of a first type that has a first performance characteristic, according to the tier management information of the first storage tier; and
upon determining that the first data content or the first metadata stored in the first tier meets a first predetermined condition of the tier management information of a second tier, migrate the first data content and the first metadata according to the management information of the second storage tier to store a third number of the first data content and a fourth number of the first metadata to at least one second storage pool of a second type in the second storage tier that has a second performance characteristic, according to the tier management information of the second storage tier, wherein the third number of the first data content is lower than the first number of the first data content and the fourth number of the first metadata is lower than the second number of the first metadata.

6. The storage method of claim 5,
the method further comprises the step of:
for each of the plurality of storage pools, limiting the number of copies of the data content and the number of copies of the metadata associated with the data content that is stored in the tier management information to be less than or equal to the total number of volumes within each respective storage pool.

7. The storage method of claim 5,
further comprising the steps of:
upon storing the first data content or the first metadata into the at least one second storage pool of the second storage tier, remove the first data content and associated first metadata from the first storage pool.

8. The storage method of claim 7,
wherein the storage system further includes a computer having a display,
wherein the method further comprises the steps of:
displaying a user interface on the display to accept an input to set the number of copies of data content to be stored and the number of copies of metadata associated with the data content to be stored for each storage pool; and
displaying a user interface on the display to accept an input to set the condition relating to metadata of the first storage tier in the tier management information.

9. The storage system of claim 1,
wherein the at least one second pool in the second tier includes storage components having one or more volumes of second storage mediums different than those of the at least one first storage pool.

10. The storage system of claim 1,
wherein one or more of the storage pools consist of only storage components that are one of direct attached storage, network attached storage, and cloud storage.

11. The storage system of claim 1,
wherein the number of copies of data content to be stored and the number of copies of metadata associated with the data content for at least one of the storage pools is different.

12. The storage system according to claim 1,
wherein the processor is further configured to:
determine whether there is a change to the stored tier management information and upon determining, based on the changed stored tier management information, that a storage pool is added to a storage tier of the plurality of storage tiers or that the number of copies of data content to be stored in a storage pool, of the plurality of storage pools, has increased:

set one of the added storage pool and the storage pool having the number of copies of data content to be stored in the storage pool increased as a copy destination storage pool, determine a volume, of the plurality of volumes of the plurality of storage pools that store a copy of the data content, to be a copy source volume of the data content based on performance characteristics of the storage mediums configuring the plurality of volumes, copy the data content from the copy source volume, store the copied data content in the one or more volumes of the copy destination storage pool according to the number of copies of data content to be stored for the copy destination storage pool based on the changed tier management information, upon determining, based on the changed stored tier management information, that a storage pool, of the plurality of storage pools, should decrease the number of copies of data content to be stored:

remove one or more copies of the data content stored in the storage pool.

13. The storage method according to claim 5, further comprising the steps of:

determining whether there is a change to the stored tier management information and upon determining, based on the changed stored tier management information, that a storage pool is added to a tier of the plurality of tiers or that the number of copies of data content to be stored in a storage pool, of the plurality of storage pools, has increased:

setting one of the added storage pool and the storage pool having the number of copies of data content to be stored in the storage pool increased as a copy destination storage pool, determine a volume, of the plurality of volumes of the plurality of storage pools that store a copy of the data content, to be a copy source volume of the data content based on performance characteristics of the storage mediums configuring the plurality of volumes, copy the data content from the copy source volume, store the copied data content in the one or more volumes of the copy destination storage pool according to the number of copies of data content to be stored for the copy destination storage pool based on the changed tier management information, upon determining, based on the changed stored tier management information, that a storage pool, of the plurality of storage pools, should decrease the number of copies of data content to be stored:

remove one or more copies of the data content stored in the storage pool.

14. The storage system according to claim 1, wherein the first storage pool of the first type in the first storage tier is included in the second storage tier.

15. The storage system according to claim 1, wherein the first type of storage pool includes one or more storage mediums that include disks which are continuously spinning, and wherein the second type of storage pool includes one or more storage mediums that include disks which are configured to spin down.

16. The storage system according to claim 15, wherein the first predetermined condition is that a predetermined amount of time has lapsed since data or metadata has been initially ingested into the first storage tier.

17. The storage system according to claim 1, wherein upon determining that data content or metadata stored in a storage pool of a the second storage tier meets a second predetermined condition of a third storage tier, which includes at least one pool of a second type having a lower performance characteristic than the second pool, migrate the data content or metadata meeting the second predetermined condition according to the tier management information of the third storage tier to one or more storage pools of the second storage tier.

18. The storage system of claim 1, wherein the processor is configured to:

upon determining that the number of copies of data content to be stored in the copy destination storage pool is greater than or equal to a number of the storage components within a copy source storage pool, each copy of the data content copies are stored in at least one volume of each of the storage components within the copy destination storage pool, and wherein the number of storage components is greater than or equal to two.

19. The storage method according to claim 5, further comprising the step of:

upon determining that the number of copies of data content to be stored in the copy destination storage pool is greater than or equal to a number of the storage components within a copy source storage pool, each copy of the data content copies are stored in at least one volume of each of the storage components within the copy destination storage pool, and wherein the number of storage components is greater than or equal to two.

* * * * *